H. C. BAUMGARDNER.
SPRAYING DEVICE.
APPLICATION FILED MAY 14, 1920.
1,384,296.
Patented July 12, 1921.
2 SHEETS—SHEET 1.
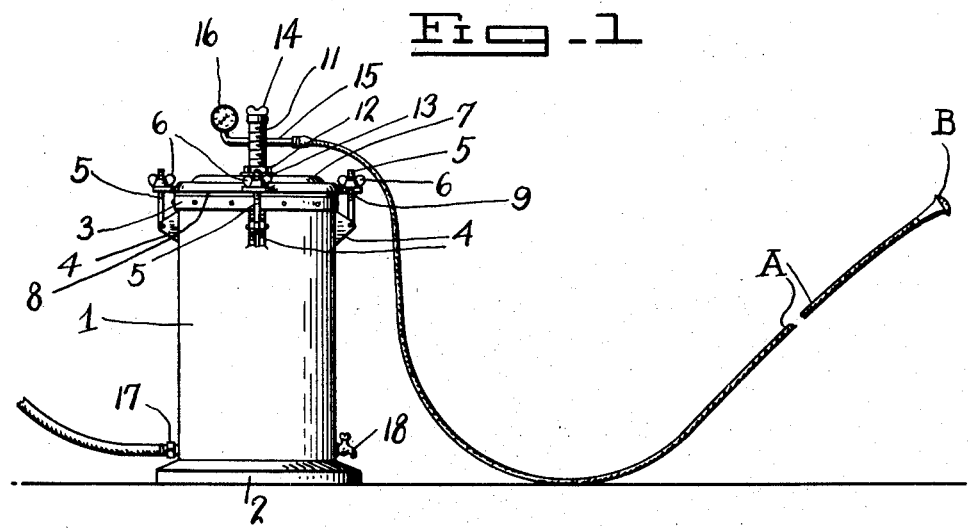
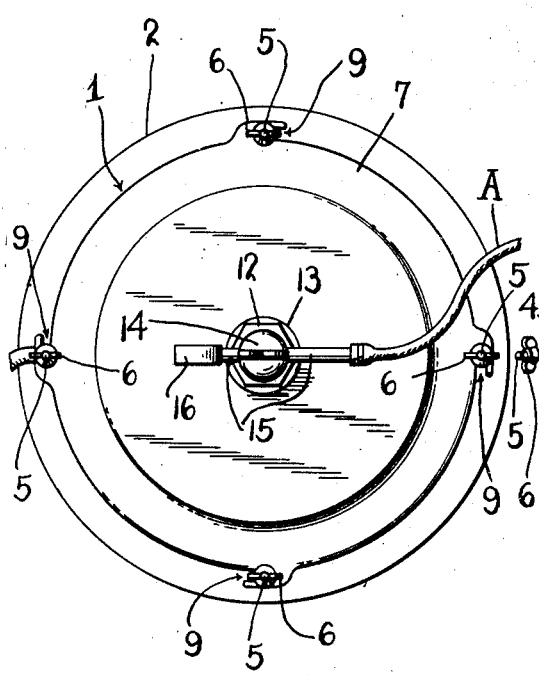
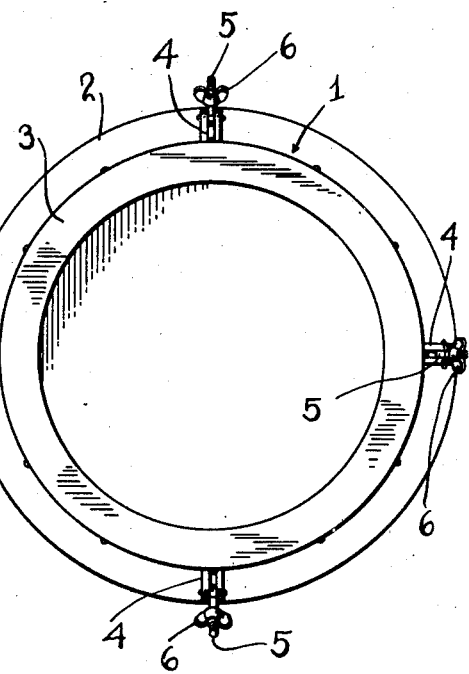
H. C. Baumgardner
INVENTOR
BY L. B. James
ATTORNEY

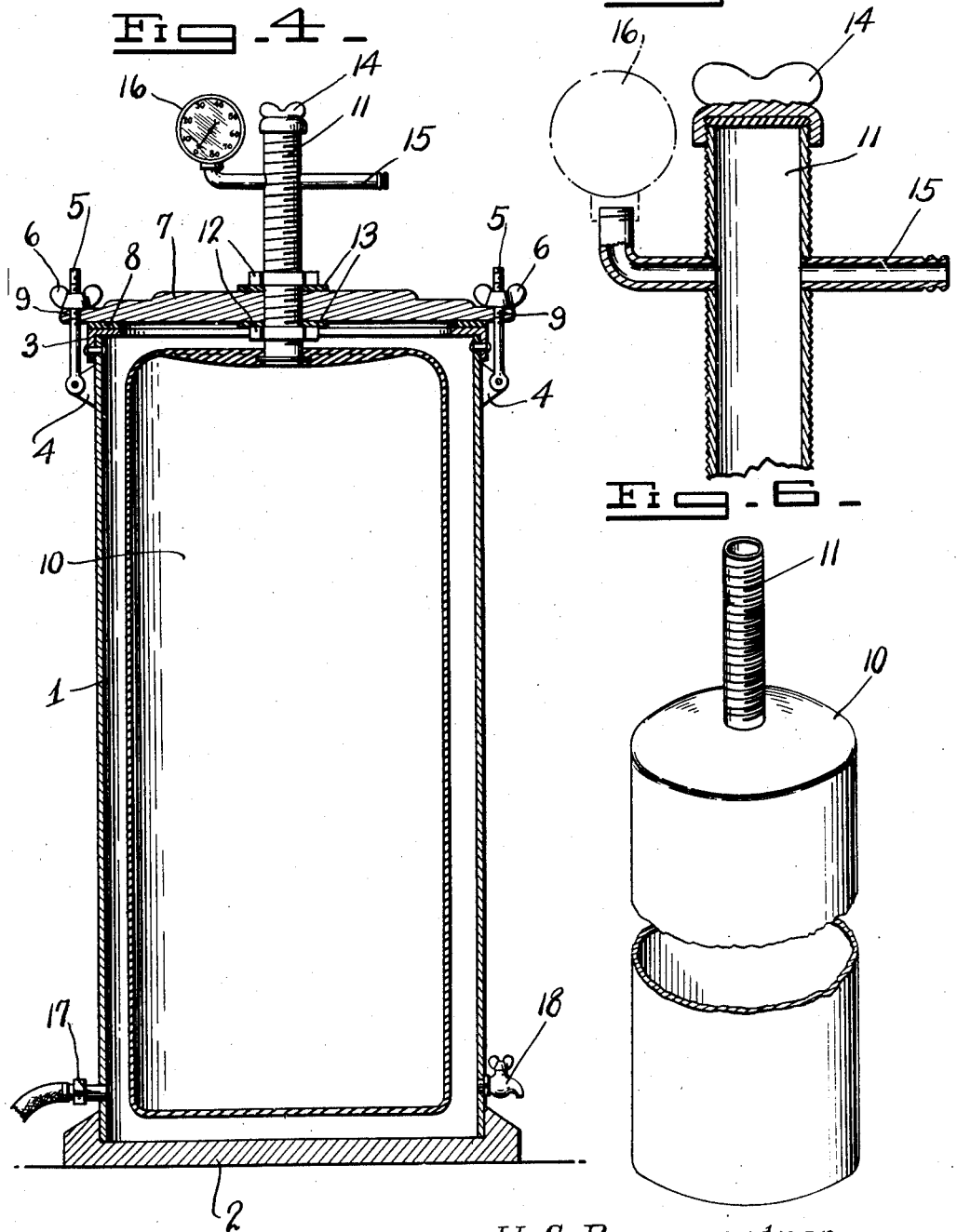

UNITED STATES PATENT OFFICE.

HENRY C. BAUMGARDNER, OF ANN ARBOR, MICHIGAN.

SPRAYING DEVICE.

1,384,296.

Specification of Letters Patent.  Patented July 12, 1921.

Application filed May 14, 1920. Serial No. 381,242.

*To all whom it may concern:*

Be it known that I, HENRY C. BAUMGARDNER, a citizen of the United States, residing at Ann Arbor, in the county of Washtenaw and State of Michigan, have invented certain new and useful Improvements in Spraying Devices, of which the following is a specification.

This invention relates to a spraying device of that type in which the liquid contents of a container is forced by pressure through a nozzle, connected with the container, with such force as to cause the liquid to leave the nozzle in the form of a spray.

The principal object of the invention is to form the container for the liquid to be sprayed of resilient material, such as rubber, and to place the same in a casing which is provided with means for inserting therein fluid under pressure, so as to compress the container and force the liquid therefrom.

Another object of the invention is to provide means whereby the container may be easily and quickly filled with the liquid and also means for easily removing the container from the casing whenever desired.

Still another object of the invention is to provide means whereby the casing may be quickly connected with a source of fluid under pressure and to provide means for draining the fluid from the casing after the container has been emptied.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the spraying device in operative position;

Fig. 2 is an enlarged plan view thereof;

Fig. 3 is an enlarged plan view of the casing with the cover removed;

Fig. 4 is an enlarged vertical sectional view of the casing in operative position;

Fig. 5 is an enlarged detail sectional view of the filling spout of the container;

Fig. 6 is a detail perspective view of the container.

In these views, 1 indicates a casing made of metal or the like, and secured to a base 2, which is of sufficient weight to hold the casing in upright condition and to prevent the same from being knocked over while the device is being used. The upper end of this casing is open but is partly closed by a ring shaped member 3 of angle shape in cross section, the vertical flange thereof being secured to the upper edge of the casing by rivets and welding so as to make a tight fluid joint. Ears 4 are secured to the upper part of the casing, said ears being arranged in pairs on opposite sides of the casing, as shown. Pivotally mounted in each pair of ears is a screw bolt 5, the bolts carrying thumb nuts 6. These bolts and nuts are intended to hold the cover 7 on the casing and in order to make a fluid tight joint between these parts, I provide a gasket 8 which rests on the horizontal flange of member 3 and is engaged by the under face of the cover 7. Thus when the bolts are engaged with the bayonet slots 9 in the cover and the nuts screwed home, said gasket will be compressed between the cover and top of the casing and so provide a fluid tight joint between these parts.

The container for the liquid to be sprayed is indicated at 10, and this container is preferably made of rubber or the like. It is of smaller diameter than the casing so as to leave a space between itself and the walls of the casing, as shown. A filling spout 11, formed of metal or the like, is connected with the upper end of the container and this spout passes through a hole formed in the cover 7 and is secured to said cover by means of the nuts 12 and the gaskets 13, a nut and gasket being on each side of the cover and the spout being screw threaded exteriorly to receive the nuts. Thus the resilient container is connected with the cover and will be withdrawn from the casing when the cover is lifted off the said casing. The upper end of the filling spout is closed by the cap 14, and a hose nipple 15 is connected with one side of the spout and a pressure gage 16 with the opposite side. The nipple is intended to receive a hose A to which the ordinary spray nozzle B is connected.

The lower end of the casing is provided with a nipple 17 which is adapted to receive one end of a hose, the other end of which is to be attached to a suitable source of fluid under pressure. A faucet 18 is connected to the lower part of the casing so that its contents may be drained therefrom.

After the cover has been tightly secured to the casing, the cap 14 is removed from the filling spout and the rubber container filled with the liquid to be sprayed through said spout. The cap is then replaced and the fluid under pressure is permitted to flow into the space between the container and the casing. This fluid will compress the container and thus force its contents through the spout, the nipple 15, and the pipe connected therewith and it will pass from the nozzle in the form of a spray. By regulating the flow of fluid into the casing the pressure on the container can be controlled so that the liquid will leave the nozzle with more or less force. Thus the device may be used to spray trees or small plants. After the contents of the container have been discharged, the flow of fluid to the casing is stopped and the fluid in the casing may be drained therefrom by opening the cock 18.

The compression fluid may be water from the city mains, or compressed air or a vessel filled with water and placed at a height and containing a weight for forcing the water through the pipe which connects the vessel with the nipple 17.

The spout 11 is preferably connected with the upper end of the container by being vulcanized thereto and this top is reinforced with thick rubber layers. This spout is threaded throughout its length with the exception of that part adjacent the top of the container.

It will be seen that there is no pumping of compressed air into the tank, and the force of the spray is adjusted by controlling the flow of the fluid entering the casing. The rubber container will last for a long time as the pressure is equal on all sides of the same, but if it should wear out it can be easily and cheaply replaced, and the rest of the device will last for years.

It is thought from the foregoing description that the advantages and novel features of my invention will be readily apparent.

I desire it to be understood that I may make changes in the construction and in the combination and arrangement of the several parts, provided that such changes fall within the scope of the appended claim.

I claim:—

A spray device of the class described comprising a casing, a removable cover therefor, a collapsible container within the casing, a screw threaded filling spout secured to the container and passing through the cover, nuts for holding the spout to said cover, a cap for closing the spout, a nozzle connected with the spout and a pressure gage connected with the spout.

In testimony whereof I affix my signature.

HENRY C. BAUMGARDNER.